United States Patent [19]

Fonneland et al.

[11] Patent Number: 5,103,082
[45] Date of Patent: Apr. 7, 1992

[54] AUTOMATIC LASER BEAM EXPANDER-PINHOLE ALIGNMENT SYSTEM

[75] Inventors: Nils J. Fonneland, Ronkonkoma, N.Y.; John V. Fine, Sr., Goosecreek, S.C.; Kenneth G. Leib, Wantagh; Benjamin J. Pernick, Forest Hills, both of N.Y.

[73] Assignee: Grumman Aerospace Corporation, Bethpage, N.Y.

[21] Appl. No.: 551,910

[22] Filed: Jul. 12, 1990

[51] Int. Cl.⁵ .............................................. G01J 1/20
[52] U.S. Cl. ........................... 250/201.1; 250/206.2; 356/400
[58] Field of Search ............ 250/237 R, 208.2, 201.1, 250/206.1, 206.2; 356/399, 400, 141, 152

[56] References Cited

U.S. PATENT DOCUMENTS 3,012,469 12/1961 Clayborne .................. 250/201.1
3,781,546 12/1973 Christian et al. ............ 250/201.1

*Primary Examiner*—David C. Nelms
*Attorney, Agent, or Firm*—Scully, Scott Murphy & Presser

[57] ABSTRACT

This invention enables a laser beam, expanding from a pinhole aperture spatial filter, to be brought back on the optical axis of an optical system such as an optical correlator system and maintained there. The principle of operation is that photodetectors spaced in the outer region of the expanding beam detect a change in orientation of the incident laser beam, and the change is measured and an error signal is used to drive electrically controlled micrometers so as to restore and maintain alignment.

47 Claims, 1 Drawing Sheet

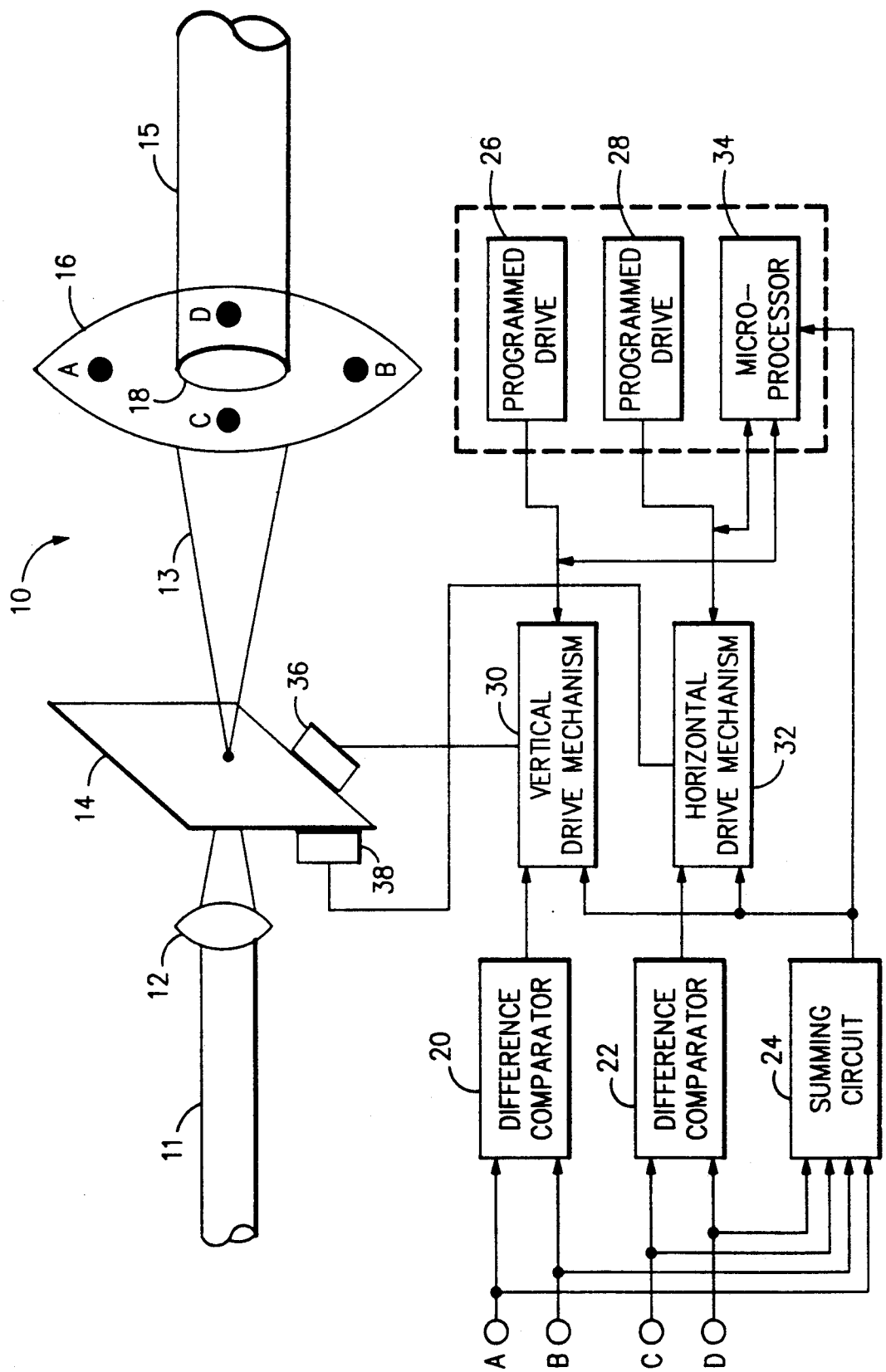

AUTOMATIC LASER BEAM EXPANDER-PINHOLE ALIGNMENT SYSTEM

BACKGROUND OF THE INVENTION

1. Field of the Invention

This invention generally relates to optical systems which employ electromechanical control systems. More particularly, this invention relates to the automatic control of a pinhole aperture spatial filter from which a laser light beam is expanding in order to achieve and maintain alignment of the expanding laser beam.

2. Discussion of the Prior Art

In any optical system, such as optical correlator systems, it is necessary to achieve and maintain alignment of an incoming laser beam. The correct spatial geometry in optics systems is critical for proper system operation and optimal system performance. The incoming laser beam is easily thrown off axis by the various lenses and apparatus it must pass through; therefore, there must be some method to achieve and maintain alignment of the laser beam. The accepted practice has been to do this by hand.

One such procedure involves utilizing a small low powered laser which emits a narrow parallel beam, and making a mark with a small ink dot in the middle of each lens in the system. By having the small laser aimed along the optic axis of the system, it can be easily seen if the beam passes through the ink dots thereby indicating if the components in the system are properly aligned. Obviously this is not an exact measurement and alignment system; however, it does provide a rough tuning of the system. The above technique is particularly useful in systems that employ mirrors because the mirrors can be manuevered to focus the beam along the optical axis of the system.

The process of beam alignment when done by hand involves measurement and adjustment by a human operator. This is a trial and error process that might require that system operation be suspended. This process is laborious and time consuming, especially if great precision is required as in most optics applications. In addition, in some applications it may not be practical for a human operator to be present, such as in an unmannered space craft; therefore, other techniques such as automatic alignment systems, which comprise automatic control systems, have increasingly become of interest.

The present invention solves the problems and limitations of the previous methods of laser beam alignment by providing applications for the automatic alignment of a pinhole aperture spatial filter in an optical system, such as those used in optical correlator systems, such that the input laser beam retains its integrity during system operation. There is a need, therefore, for an automatic laser beam expander, pinhole alignment system which provides for the automatic expansion and alignment of an incoming laser beam, maintaining this alignment, and accomplishing this during system operation with a high degree of precision.

SUMMARY OF INVENTION

The present invention is directed to an automatic laser beam expander, pinhole alignment system for providing for the automatic alignment of the spatial filter in an optical system so that the input laser beam retains its integrity during system operation. The present invention is comprised of three basic components. The first component is a pinhole aperture spatial filter which is used to filter optical disturbances from the incoming laser beam. The second component is a feedback control system used to automatically control the position of said pinhole aperture spatial filter. The third component is programmable position control system which provides a coarser control of the pinhole aperture spatial filter.

The incoming laser beam is passed through a position adjustable pinhole aperture spatial filter. The pinhole aperture spatial filter blocks portions of the focused beam that are due to noise and optical disturbances. The exiting beam expands in a cone-like manner and is incident upon a collimation lens mounted in an array of photodetectors. These photodetectors are arranged in such a way as to determine if the incident beam is misaligned in any direction. If there is no beam misalignment then a zero valued position error signal from the photodetectors is sent to a feedback position control system and no action is taken; however, if there is beam misalignment then a non-zero position error signal is sent to the position control system. The position control system then outputs a set of commands to a pair of motors which drive the position adjustable pinhole aperture spatial filter to the proper location for laser beam alignment.

The programmable position control system provides a level of control for the pinhole aperture spatial filter when the laser beam is substantially off the optic axis of the system. The programmable position control system moves the pinhole aperture over a predetermined set of trajectories in order to establish a location for the pinhole aperture where there is a maximum level of light incident upon the array of photodetectors. Upon completion of the programmed trajectories, the programmable position control system returns the pinhole aperture spatial filter to the location that corresponds to the maximum light intensity whereupon the feedback control system further aligns the pinhole aperture spatial filter.

The automatic laser beam expander, pinhole alignment system of the present invention provides for the automatic expansion and alignment of a beam of laser light with great precision. In addition, it provides for maintaining the alignment during system operation under diverse applications. The invention provides a new and practical means to adjust and maintain alignment of an incoming laser beam in real-time requiring a small area, low weight and minimal power consumption. The automatic laser beam expander, pinhole alignment system can be used in optical correlator systems or in any optics system that requires precise alignment of its laser beam.

BRIEF DESCRIPTION OF THE DRAWINGS

For the purpose of illustrating the invention, there is shown in the drawing the forms which are presently preferred; however, it should be understood that the invention is not necessarily limited to the precise arrangements and instrumentalities here shown.

The sole Figure is a block diagram of the automatic laser beam expander-pinhole alignment system of the present invention.

DESCRIPTION OF THE PREFERRED EMBODIMENT

The automatic laser beam expander, pinhole alignment system of the present invention automatically enables a laser beam expanding from a pinhole aperture spatial filter to be brought back on the optical axis of the optical system and maintained there. A narrow laser beam is focused by an objective lens onto a pinhole aperture spatial filter located in the back focal plane of an objective lens. The pinhole aperture spatial filter blocks portions of the focused beam that are due to noise and optical disturbances in the laser and lens assemblies. Light emerging from the pinhole aperture expands in a cone-like manner and is incident upon a collimation lens. When the collimation lens and the incident laser beam are properly aligned, the exiting beam is collimated. The collimation lens is mounted in a plexiglass frame containing an array of photodectors. These photodectors are arranged in such a way as to determine if the incident beam is properly aligned. These photodectors generate electrical signals proportional to the given light intensity when light is incident upon them, thus indicating possible laser beam misalignment. These electrical signals are then processed and fed into a feedback, position control servomechanism. Based on the signals from the array of photodectors, a pair of electric motors drive electrically controlled motor driven micrometers attached to the pinhole aperture spatial filter assembly so as to restore alignment.

There are certain instances when the beam is substantially off axis such that the laser light is not incident upon the detectors at all. In these cases, the pinhole aperture spatial filter is driven in a predetermined manner by means of the aforementioned motor drive mechanisms under the control of a microprocessor. The pinhole aperture spatial filter is moved in a programmed raster pattern to traverse the region in the vicinity of the focused laser beam. While the pinhole aperture spatial filter is moving, the output of the array of photodetectors are being electronically summed. The output of the summation means is then fed into the microprocessor that is controlling the means that provide the predetermined raster pattern. Upon completion of the programmed raster pattern, the microprocessor searches its memory for the aperture coordinates corresponding to the maximum level of light intensity or for a predetermined level of light intensity, depending upon how the microprocessor is programmed. The maximum level of light intensity or the predetermined level of light intensity is determined by the programming of the microprocessor and information provided by the output of the summation means. The microprocessor then returns the pinhole aperture spatial filter to the corresponding position and the aforementioned feedback control system fine tunes the alignment.

Referring now to the Figure, there is shown a schematic diagram illustrating the automatic laser beam expander, pinhole alignment system 10 architecture. The system is comprised of an objective lens 12, a pinhole aperture spatial filter 14, an array of photodetectors 16 A-D mounted in a plexiglass frame, a collimation lens 18, a differential amplifier circuit 20 for the vertical positioned photodetectors, a differential amplifier circuit 22 for the horizontal positioned photodetectors, a summation circuit 24, a programmed drive 26 containing pre-determined vertical trajectories, a programmed drive 28 containing pre-determined horizontal trajectories, a vertical drive mechanism 30, a horizontal drive mechanism 32, a microprocessor 34, and two electrically adjustable, motor driven micrometers 36 and 38.

A narrow beam of substantially coherent electromagnetic radiation 11 generated by a laser, not shown, is focused by an objective lens 12 onto a pinhole aperture spatial filter 14 located in the back focal plane of the objective lens 12. The incoming narrow beam of substantially coherent electromagnetic radiation, laser light, 11 contains optical noise and optical disturbances inherent in laser operation and lens assemblies. The pinhole aperture spatial filter 14 acts as an optical filter to the incoming beam of electromagnetic radiation, physically blocking out the unwanted frequencies and optical disturbances. The filtered laser light 13 emerging from the pinhole aperture spatial filter 14 expands in a cone-like manner until it is redirected. This expanded light beam 13 is now incident upon and redirected by a collimation lens 18. When the collimation lens 18 and the incident laser light are properly aligned, the exiting beam is collimated. The collimation lens 18 is used to focus light from a source near one of its focal points into a parallel beam 15. The collimation lens 18 is mounted in the plexiglass frame containing an array of photodetectors 16 or light detectors.

The particular arrangement of the individual photodetectors, of the array of photodetectors 16, indicated by the letters A, B, C and D are located approximately 90 degrees apart in a plane perpendicular to the optic axis of the system. In this embodiment the individual photodetectors are arranged in pairs in order to establish a relative difference between the two photodetectors that comprise the particular pair, thus creating a position reference signal to be used in calculating a position correcting actuation signal or position error signal. The AB pair of photodetectors is used to detect laser beam misalignment in the vertical direction while the CD pair of photodetectors is used to detect laser beam misalignment in the horizontal direction. It is important to note that other detector arrangements are possible. In addition, if increased precision is necessary, then more photodetectors can be added; however, it is important to keep some type of a pairwise orientation so as to establish a reference point in that particular arrangement of photodetectors. As indicated previously, the two pairs of photodetectors, AB and CD are located along orthogonal axes for vertical and horizontal positioning control respectively. In this embodiment of the invention, the photdetectors are light sensitive diodes that respond to light intensity and provide an electrical signal proportional to the incident light intensity. As shown in FIG. 1, the array of photodetectors or light sensitive diodes 16 are located inside of the maximum radius of the expanding beam 13, but outside of the collimation lens' 18 maximum diameter. The array of light sensitive diodes 16 are mounted in a plexiglass frame that is also used to hold the collimation lens 18. The incoming light beam 13 is ideally incident upon the collimation lens 18 only; however, if the vertical alignment of the pinhole aperture 14 were incorrect, then the AB photodetector pair would indicate this misalignment in the form of unequal intensities thus creating a potential difference between the two light sensitive diodes. In a similar manner, if the horizontal alignment of the pinhole aperture 14 were incorrect, then the CD photodetector pair would indicate the misalignment. If both or either the vertical and horizontal alignments are correct, then there would be no difference in the light sensitive diode potentials and correction would not be necessary. Alternatively, if there is a misalignment in either or both directions, then the potential differencies created by the the light sensitive diode pairs would be used to supply commands to physically move the pinhole aperture spatial filter 14 via a feedback control system until the point where laser beam alignment were correct.

If there is a vertical misalignment of the laser beam, then as stated before, photodetector A and photodetector B will be at different potentials. The output potentials of this light sensitive diode pair are fed into a differential amplifier circuit 20. The principle behind the differential amplifier circuit 20 is that if a potential difference exists between the inputs to the differential amplifier 20, then the output of the differential amplifier circuit 20 shall be non-zero, and if no potential difference exists between the inputs, then the output would be zero. The various gains of the differential amplifier 20 circuit can be adjusted to scale the output to an acceptable level for further processing. Scaling is necessary in order to have a high enough output to drive the next stage of the control system and to ensure that the system is a stable system. The term stable as used hereinafter shall mean in the terms of a dynamic system, a system which in the presence of disturbances will tend to move towards an equilibrium point or at least not move away from this equilibrium point. As is stated above, if no potential difference exists between the inputs of the differential amplifier circuit 20, then the output would be zero and the scaling would have no effect, and if there is a potential difference between the inputs, then the output would be non-zero and scaled to drive the next stage of the system. In a method identical to the described above, the light sensitive diode pair for the horizontal direction are fed into a second differential amplifier circuit 22 wherein it operates in an identical manner as that of differential amplifier 20.

In addition to being supplied to the differential amplifier circuits 20 and 22, all detector signals are fed into a summing network 24. The summing network 24 is a device used to add all inputs and come up with one scaled output representative of the composite input. Once again, the output can be scaled as necessary to ensure stable system operation. The purpose of the summation network will be fully explained in the following paragraphs. It is important to note that the above discribed circuits are commonly used devices and their design and use is well known in the art.

If there is a non-zero output from either of the differential amplifier circuits 20 or 22 this would imply a misalignment of the laser beam which indicates misalignment of the pinhole aperture spatial filter 14. If the output of the differential amplifier circuit 20 is non-zero, indicating a misalignment in the vertical direction, then the scaled output of circuit 20 is fed into the electromechanical drive mechanism 30 responsible for movement of the pinhole aperture spatial filter 14 in the vertical direction. In a similar manner, if the output of the differential amplifier circuit 22 is non-zero, indicating a misalignment in the horizontal direction, then the scaled output of circuit 22 is fed into the electromechanical drive mechanism 32 responsible for movement of the pinhole aperture spatial filter 14 in the horizontal direction. The output of the summing circuit 24 is used to provide a normalizing reference signal which is needed to normalize the input signals to the electromechanical drive components. This normalizing signal provides a common reference point for the motor controlling input signals. It is important to note that all circuit gains and all system parameter gains are picked in order to achieve system stability while maintaining all desired system design parameters such as, but not limited to, the peak overshoot and settling time. These parameters govern the control system characteristics, and are chosen in order to achieve desired system operation results as well as system stability.

In this embodiment of the invention, the electromechanical drive mechanisms 30 and 32 are precision d.c. motors which drive electrically controlled motor driven micrometers 36 and 38 which in turn move the pinhole aperture spatial filter 14. The precesion d.c. motors are set up as voltage controlled motors which respond to the voltage output signals from the differential amplifier circuits 20 and 22. Once again, it is important to note that this motor-micrometer set up is not unique, and other devices might suggest themselves to someone skilled in the art.

The response and performance characteristics of the control system is based on the specific design requirements such as, but not limited to peak overshoot and settling time. The basic operation, however, is based on the difference signals generated by the differential amplifier circuits 20 and 22. These signals indicate the amount of correction necessary to achieve alignment. The feedback control system of the present invention is based on the principle of negative position feedback. Position feedback is used in control systems to determine the position of what is being controlled and to correct the position if this position disagrees with the commanded or desired position. In feedback control systems, specifically negative feedback control systems, a command is entered into the forward path that shall cause a desired action to take place. A command can be entered that shall cause a motor to drive an adjustable pinhole aperture to a predetermined position. An array of photodetectors supply a reference signal indicating the pinhole aperture's actual position. This position is fed back into a summing network and negatively summed with the input command signal. This is the principle of negative feedback. The difference between the commanded position and the actual measured position is the error signal or actuation signal. This error signal which is a direct representation of the difference in positions is now the new command to the motor. When there is no longer a difference between desired position and actual position, the error signal is zero and thus there is no command to the motor. In other words, the motor shall only cause the adjustable pinhole aperture to move when a difference exists between the commanded position and the actual position. The present invention does not employ a negative feedback control system in the strict sense because it does not rely on a difference between a reference signal and an actual signal; however, it does rely on a feedback signal that must be reduced to zero output in order to achieve the desired effect which is laser beam alignment. The above explanation of control theory, however, illustrates the general concepts involving the positioning of the pinhole aperture 14 based on the error signals derived ultimately from the signals from the array of photodetectors 16.

The basic operation of the feedback control system portion of the present invention is to manipulate the position of the pinhole aperture spatial filter 14 in order to focus and align the laser beam expanding from filter 14 onto a collimation lens 18. The array of photodetectors 16 provide electrical signals indicative of the position of the expanding laser light to differential amplifier circuits 20 and 22 which in turn provide position error signals or actuating signals to a vertical drive mechanism 30 and a horizontal drive mechanism 32 which are d.c. motors used to control a pair of motor driven micrometers 36 and 38. Based on the outputs of the differential amplifier circuits 20 and 22, the motors cause the micrometers 36 and 38 to move the pinhole aperture spatial filter 14 to a position that will properly align the expanding beam with the collination lens 18.

A different situation exists if the pinhole aperture spatial filter 14 is completely out of alignment such that little or no light is incident on the array of photodetectors. One embodiment of this invention uses a microprocessor to control a programmable position control system which outputs a raster scan pattern to traverse fully the region in the vicinity of the focused laser beam. The trajectory of the pinhole aperture spatial filter 14 is determined by the programmed vertical drive 26 and the programmed horizontal drive 28. These programmed trajectories are controlled by the microprocessor 34 and drive the same vertical drive means 30 and horizontal drive means 32 as used by the aforementioned feedback control system. As the pinhole aperture spatial filter 14 is being driven through the various trajectories, the array of photodetectors 16 is continuously providing the summing circuit 24 with the individual electrical equivalents of the various light intensities in order to form one signal indicative of the composite intensity of the laser light. This signal in conjunction with the programmed trajectories are fed into microprocessor 34. The purpose of the microprocessor 34 is to determine when the drives have positioned the pinhole aperture spatial filter 14 such that the summation network 24 output is at a maximum level. Upon completion of the programmed raster pattern, the microprocessor 34 searches its memory for the pinhole aperture spatial filter 14 coordinates corresponding to the maximum level of light intensity. The microprocessor 34 then commands the mechanical drive mechanisms 30 and 32 to drive the adjustable pinhole aperture spatial filter 14 to the given position. When this is accomplished, the feedback control system described previously now automatically switches in and fine tunes or aligns and maintains alignment of the optical components.

A second embodiment of the invention exists when the adjustable pinhole aperture spatial filter 14 is completely out of alignment. In this embodiment the adjustable pinhole aperture spatial filter 14 is driven through the same raster pattern, however, instead of looking for a maximum light intensity, the microprocessor 34 is looking for a predetermined light intensity level. The microprocessor 34 then drives the adjustable pinhole aperture spatial filter 14 to this position. Then as mentioned earlier, the system would automatically switch to the fine tuning procedure.

The microprocessor 34 receives signals from the summation circuit 24 indicating the composite laser light intensity incident upon the array of photodectors 16. When the level of the composite signal falls below a predetermined level, indicating that the feedback control system portion of the present invention cannot properly align the laser beam, the microprocessor automatically switches the programmed vertical drive 26 and the programmed horizontal drive 28 into operation. The programmed drives 26 and 28 are hardware memory devices that contain programs that are used to output signals to the vertical drive mechanism 30 and the horizontal drive mechanism 32 in order to move the pinhole aperture spatial filter 14 in the predetermined raster pattern.

Although shown and described in what are believed to be the most practical and preferred embodiments, it is apparent that departures from specific methods and designs described and shown will suggest themselves to those skilled in the art and may be used without departing from the spriit and scope of the invention. The present invention is not restricted to the particular constructions described and illustrated, but should be construed to coher of all modifications that may fall within the scope of the appended claims.

What is claimed is:

1. An automatic laser beam expander, pinhole alignment system comprising:
    a pinhole aperture spatial filter which blocks portions of a laser beam;
    an automatic closed loop control system for controlling the position of said pinhole aperture based on a plurality of position feedback signals; and
    a programmable position control system for adjusting the position of said pinhole aperture along a predetermined pattern.

2. The alignment system of claim 1, wherein said automatic closed loop control system comprises:
    a plurality of photodetectors which generate said plurality of position feedback signals; and
    a first and second position error means for determining the degree of laser beam misalignment in the vertical and horizontal directions, respectively, based on said plurality of position feedback signals, said first and second position error means outputting a pair of signals to a first and second drive means.

3. The alignment system of claim 2, wherein said first and second drive means is operable to move the pinhole aperture in the vertical and horizontal directions respectively.

4. The alignment system of claim 1, wherein said programmable position control system comprises:
    a microprocessor which provides a plurality of command signals to a first and second drive means; and
    a first and second programmed drive means which contain a set of programmed raster scan patterns, said first and second programmed drive means are controlled by said microprocessor.

5. The alignment system of claim 4, wherein said first and second drive means is operable to move the pinhole aperture in a predetermined raster scan pattern.

6. An automatic laser beam expander, pinhole alignment system comprising:
    a pinhole aperture spatial filter which blocks portions of a laser beam and from which laser light expands in a cone-like manner;
    a detection means for detecting an off axis laser beam expanding from said pinhole aperture; and
    an automatic control means for automatically controlling the position of said pinhole aperture in order to align and maintain alignment of said laser beam.

7. The alignment system of claim 6, wherein said detection means comprises a plurality of photodetectors arranged in a predetermined pattern, said plurality of photodetectors are used to detect the intensity of incident laser light and convert the light energy into electrical signals propotional to the incident light intensity.

8. The alignment system of claim 7, wherein said plurality of photodetectors consists of at least four photodetectors arranged ninety degrees apart in a plane perpendicular to the optic axis, thus creating a first and second pair orientation of photodetectors which is used to establish relative intensities of laser light in the vertical and horizontal directions respectively.

9. The alignment system of claim 8, wherein said photodetectors are light sensitive diodes which are mounted in a frame inside the radius of the expanding laser beam.

10. The alignment system of claim 8, wherein said automatic control means for controlling the position of said pinhole aperture comprises:
a vertical position error means for determining the degree of laser beam misalignment based on a first pair of input signals derived from said first pair of photodetectors, said vertical position error means outputting a vertical position error signal, which indicates the present vertical orientation of the pinhole aperture, to a vertical drive means; and
a horizontal position error means for determining the degree of laser beam misalignment based on a second pair of input signals derived from said second pair of photodetectors, said horizontal position error means outputting a horizontal position error signal, which indicates the present horizontal orientation of the pinhole aperture, to a horizontal drive means.

11. The alignment system of claim 10, wherein said automatic control means further includes a summation means for determining the composite laser light intensity incident upon said first and second pair of photodetectors, said summation means outputting a normalizing signal which represents the composite laser light intensity.

12. The alignment system of claim 11, wherein said summation means is a summizing circuit.

13. The alignment system of claim 10, wherein said vertical position error means comprises a first differential amplifier circuit which calculates the difference between the first pair of signals derived from said first pair of photodetectors, said first differential amplifier circuit outputting a first signal, indicative of the degree of laser beam misalignment in the vertical direction, to a vertical drive means.

14. The alignment system of claim 10, wherein said horizontal position error means comprises a second differential amplifier circuit which calculates the difference between the second pair of signals derived from said second pair of photodetectors, said second differential amplifier circuit outputting a second signal, indicative of the degree of laser beam misalignment in the horizontal direction, to a horizontal drive means.

15. The alignment system of claim 13, wherein said vertical drive means comprises:
a first motor which is controlled by said first output signal from said first differential amplifier circuit and said normalizing signal; and
a first motor driven micrometer which is attached to said first motor and to said pinhole aperture for joint movement therewith, said first motor driven micrometer is driven by said first motor to cause movement of said pinhole aperture in the vertical direction thus causing alignment of said laser beam on the optic axis in the vertical direction.

16. The alignment system of claim 14 wherein said horizontal drive means comprises:
a second motor which is controlled by said second output signal from said second differential amplifier circuit and said normalizing signal; and
a second motor driven micrometer which is attached to said second motor and to said pinhole aperture for joint movement therewith, said second motor driven micrometer is driven by said second motor to cause movement of said pinhole aperture in the horizontal direction thus causing alignment of said laser beam on the optic axis in the horizontal direction.

17. The alignment system of claim 15, wherein said first motor is a voltage controlled d.c. motor.

18. The alignment system of claim 16, wherein said second motor is a voltage controlled d.c. motor.

19. An automatic laser beam expander, pinhole alignment system comprising:
a pinhole aperture spatial filter which blocks portions of a laser beam and from which laser light expands in a cone-like manner;
a detection means for detecting a substantially off axis laser beam expanding from said pinhole aperture; and
a programmable control means for moving said pinhole aperture over a programmed trajectory in both the horizontal and vertical directions.

20. The alignment system of claim 19, wherein said detection means comprises a plurality of photodetectors arranged in a predetermined pattern, said plurality of photodetectors are used to detect the intensity of incident laser light and convert the light energy into electrical signals proportional to the light intensity.

21. The alignment system of claim 20, wherein said plurality of photodetectors consists of at least four photodetectors arranged ninety degrees apart in a plane perpendicular to the optic axis, thus creating a first and second pair orientation of photodetectors which is used to establish relative intensities of laser light in the vertical and horizontal directions respectively.

22. The alignment system of claim 21, wherein said photodetectors are light sensitive diodes which are mounted in a frame inside the radius of the expanding laser beam.

23. The alignment system of claim 21, wherein said programmable control means for moving said pinhole aperture over a programmed trajectory comprises:
a programmed vertical drive means which contains a programmed vertical trajectory raster pattern for said pinhole aperture, said programmed vertical drive means outputs said programmed vertical trajectory to a vertical drive means;
a programmed horizontal drive means which contains a programmed horizontal trajectory raster pattern for said pinhole aperture, said programmed horizontal drive means outputs said programmed horizontal trajectory to a horizontal drive means; and
a microprocessor which controls said programmed vertical and said programmed horizontal drive means, said microprocessor has a memory space allocated for storing information.

24. The alignment system of claim 23, wherein said programmable control means further includes a summation means for determining the composite laser light intensity incident upon said first and second pair of photodetectors, said summation means outputting a signal which represents the composite laser light intensity.

25. The alignment system of claim 23, wherein said programmed vertical drive means outputs said programmed vertical trajectory to said vertical drive means upon command from said microprocessor, and said programmed vertical drive means outputs a plurality of vertical coordinates indicating the exact position of said pinhole aperture to said microprocessor.

26. The alignment system of claim 23, wherein said programmed horizontal drive means outputs said programmed horizontal trajectory to said horizontal drive means upon command from said microprocessor, and said programmed horizontal drive means outputs a plurality of horizontal coordinates indicating its exact position of said pinhole aperture to said microprocessor.

27. The alignment system of claim 26, wherein said microprocessor receives said output signal from said summation means and stores it in said memory space along with said plurality of horizontal and said plurality of vertical coordinates, upon completion of said programmed vertical and horizontal trajectories, said microprocessor will search said memory and locate the vertical and horizontal coordinates which have a light intensity as indicated by said summation means above a predetermined level and then return said pinhole aperture to above mentioned coordinates.

28. The alignment system of claim 24, wherein said summation means is a summing circuit.

29. The alignment system of claim 25, wherein said vertical drive means comprises:
a first motor which is controlled by said programmed vertical drive means; and
a first motor driven micrometer which is attached to said first motor and to said pinhole aperture for joint movement therewith, said first motor driven micrometer is driven by said first motor to cause movement of said pinhole aperture in the vertical direction.

30. The alignment system of claim 26, wherein said horizontal drive means comprises:
a second motor which is controlled by said programmed horizontal drive means; and
a second motor driven micrometer which is attached to said second motor and to said pinhole aperture for joint movement therewith, said second motor driven micrometer is driven by said second motor to cause movement of said pinhole aperture in the horizontal direction.

31. The alignment system of claim 29, wherein said first motor is a voltage controlled d.c. motor.

32. The alignment system of claim 30, wherein said second motor is a voltage controlled d.c. motor.

33. A method of aligning and maintaining alignment of a laser beam expanding from a pinhole aperture spatial filter on its optic axis, said method comprising the steps of:
detecting the off axis laser beam expanding from said pinhole aperture; and
automatically controlling the position of said pinhole aperture in order to align and maintain alignment of said laser beam.

34. The method according to claim 33, wherein said detecting step utilizes a plurality of photodetectors arranged in a predetermined pattern to detect the intensity of incident laser light and convert the light energy into electrical signals proportional to the incident light intensity.

35. The method according to claim 34, wherein said detecting step further includes arranging at least four of said photodetectors ninety degrees apart in a plane perpendicular to the optic axis thus creating a first and second pair orientation of photodetectors and establishing relative intensities of laser light in the vertical and horizontal directions.

36. The method according to claim 35, wherein automatically controlling the position of said pinhole aperture comprises the steps of:
determining the degree of laser beam misalignment in the vertical direction based on a first pair of input signals derived from said first pair of photodetectors and outputting a vertical position error signal which indicates the present vertical orientation of the pinhole aperture;
determining the degree of laser beam misalignment in the horizontal direction based on a second pair of input signals derived from said second pair of photodetectors and outputting a horizontal position error signal which indicates the present horizontal orientation of the pinhole aperture; and
determining the composite laser light intensity incident upon said first and second pair of photodetectors, and outputting a normalizing signal representing the composite laser light intensity.

37. The method according to claim 36, wherein said step of determining the degree of laser beam misalignment in the vertical direction further includes calculating the difference between the first pair of input signals derived from said first pair of photodetectors and outputting said vertical position error signal which is indicative of said difference.

38. The method according to claim 36, wherein said step of determining the degree of laser beam misalignment in the horizontal direction further includes calculating the difference between the second pair of input signals derived from said second pair of photodetectors and outputting said horizontal position error signal which is indicative of said difference.

39. The method according to claim 37, wherein said step of controlling the position of said pinhole aperture further includes controlling a first motor with said vertical position error signal, said first motor driving a first motor driven micrometer which is attached to said pinhole aperture for joint movement therewith, thus aligning said expanding laser beam in the vertical direction.

40. The method according to claim 38, wherein said step of controlling the position of said pinhole aperture further includes controlling a second motor with said horizontal position error signal, said second motor driving a second motor driven micrometer which is attached to said pinhole aperture for joint movement therewith, thus aligning said expanding laser beam in the horizontal direction.

41. A method of aligning and maintaining alignment of a laser beam expanding from a pinhole aperture spatial filter on its optic axis, said method comprising the steps of:
detecting a substantially off axis laser beam expanding from said pinhole aperture; and
moving said pinhole aperture over a programmed trajectory in both the horizontal and vertical directions.

42. The method according to claim 41, wherein said detecting step utilizes a plurality of photodetectors arranged in a predetermined pattern to detect the intensity of incident laser light and convert the light energy into electrical signals proportional to the incident light intensity.

43. The method according to claim 42, wherein said detecting step further includes arranging at least four of said photodectors ninety degrees apart in a plane perpendicular to the optic axis thus creating a first and second pair orientation of photodectors and establishing relative intensities of laser light in the vertical and horizontal directions.

44. The method according to claim 43, wherein said step of moving said pinhole aperture comprises the steps of:
- outputting a programmed vertical trajectory to a first motor;
- outputting a programmed horizontal trajectory to a second motor; and
- determining the composite laser light intensity incident upon said first and second pair of photodectors, and outputting a signal which represents the composite laser light intensity.

45. The method according to claim 44, wherein said step of moving said pinhole aperture further includes controlling a first motor with said programmed vertical trajectory, said first motor driving a first motor driven micrometer which is attached to said pinhole aperture for joint movement therewith.

46. The method according to claim 44, wherein said step of moving said pinhole aperture further includes controlling a second motor with said programmed horizontal trajectory, said second motor driving a second motor driven micrometer which is attached to said pinhole aperture for joint movement therewith.

47. The method according to claim 44, wherein said step of moving said pinhole aperture further includes moving said pinhole aperture to a position that corresponds to having a predetermined light intensity value incident upon said first and second pair of photodectors upon completing said programmed vertical and horizontal trajectories.

* * * * *